United States Patent [19]

Ramirez et al.

[11] Patent Number: 5,495,175
[45] Date of Patent: Feb. 27, 1996

[54] USING ELECTROKINETIC PHENOMENA AND ELECTRICAL RESISTANCE TOMOGRAPHY TO CHARACTERIZE THE MOVEMENT OF SUBSURFACE FLUIDS

[75] Inventors: Abelardo L. Ramirez, Pleasanton; John F. Cooper, Oakland; William D. Daily, Livermore, all of Calif.

[73] Assignee: The Regents of the University of California, Oakland, Calif.

[21] Appl. No.: 129,733

[22] Filed: Sep. 14, 1993

[51] Int. Cl.$^6$ .............................. G01V 3/02; G01V 3/04; G01V 3/00
[52] U.S. Cl. ............................................. 324/357; 324/353
[58] Field of Search ..................... 324/353, 354, 324/355, 357

[56] References Cited

U.S. PATENT DOCUMENTS 3,599,084  8/1971  Bakamjian ..................... 324/553

Primary Examiner—Walter E. Snow
Attorney, Agent, or Firm—Henry P. Sartorio; John P. Wooldridge

[57] ABSTRACT

This invention relates generally to the remote detections of subsurface liquid contaminants using in combination a geophysical technique known as ERT and an EKS. Electrokinetic transport is used to enhance the ability of electrical resistance tomography (ERT) to detect position and movement of subsurface contaminant liquids, particles or ions. ERT images alone are difficult to interpret because of natural inhomogeneities in soil composition and electrical properties. By subtracting two or more ERT images obtained before and after field induced movement, a high contrast image of a plume of distinct electrokinetic properties can be seen. The invention is applicable to important subsurface characterization problems including, as examples, (1) detection of liquid-saturated plumes of contaminants such as those associated with leaks from underground storage tanks containing hazardous concentrated electrolytes, (2) detection and characterization of soils contaminated with organic pollutants such as droplets of gasoline; and (3) monitoring the progress of electrokinetic containment or clean up of underground contamination.

15 Claims, 1 Drawing Sheet

USING ELECTROKINETIC PHENOMENA AND ELECTRICAL RESISTANCE TOMOGRAPHY TO CHARACTERIZE THE MOVEMENT OF SUBSURFACE FLUIDS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to subsurface imagining of soil and rock properties. More specifically, it relates to a method using electrokinetic transport to enhance the ability of electrical resistance tomography (ERT) to detect position and movement of subsurface contaminant liquids, particles or ions.

2. Description of Related Art

Many applications require detection of liquid contamination in subsurface soils or rocks. For example, many subsurface gasoline tanks have leaked gasoline for years before the problem was detected. Similarly, holding ponds for liquid toxic wastes and various types of waste landfills have leaked and continue to leak waste. In both of these applications it is highly desirable to detect the existence of a leak and to map the subsurface region through which the waste is moving. Fixing the leaking structure and environmental restoration of the contaminated soils can be made more effectively when this information is available. Subsurface soil and groundwater are generally monitored from boreholes using sensors or obtaining material samples which only represent conditions at points along the borehole wall; these measurements only represent the liquid content of the soil located within inches of the borehole. In order to detect liquid contamination at locations removed from one borehole generally requires the expensive drilling of additional boreholes.

SUMMARY OF THE INVENTION

It is an object of the present invention to provide a method using electrokinetic transport to enhance the ability of electrical resistance tomography (ERT) to detect position and movement of subsurface contaminant liquids, particles or ions.

It is also an object of the present invention to provide a method for subsurface imaging of soil and rock properties using electrokinetic phenomena and electrical resistance tomography.

Electrokinetic transport is used to enhance the ability of electrical resistance tomography (ERT) to detect position and movement of subsurface contaminant liquids, particles or ions. ERT images alone are difficult to interpret because of natural inhomogeneities in soil composition and electrical properties. Electrokinetic transport refers to the electric-field induced movement of either liquids (electroosmosis), particles (electrophoresis) or ions and charge complexes (electromigration). Electrokinetic transport depends on the electroosmotic permeability of the soil and on the interfacial properties of particles. Electrokinetic permeability is nearly invariant with soil type and depends on the static electric field distribution in the soil, on the electrolyte concentration and ionic strength, and on the specific absorptivity of ions. By subtracting two or more ERT images obtained before and after field induced movement, a high contrast image of a plume of distinct electrokinetic properties can be seen. The invention is applicable to important subsurface characterization problems including, as examples, (1) detection of liquid-saturated plumes of contaminants such as those associated with leaks from underground storage tanks containing hazardous concentrated electrolytes, (2) detection and characterization of soils contaminated with organic pollutants such as droplets of gasoline; and (3) monitoring the progress of electrokinetic containment or clean up of underground contamination.

BRIEF DESCRIPTION OF THE DRAWINGS

The single FIGURE shows the use of an electrokinetic system to displace a liquid plume.

DETAILED DESCRIPTION OF THE INVENTION

Figure 1:
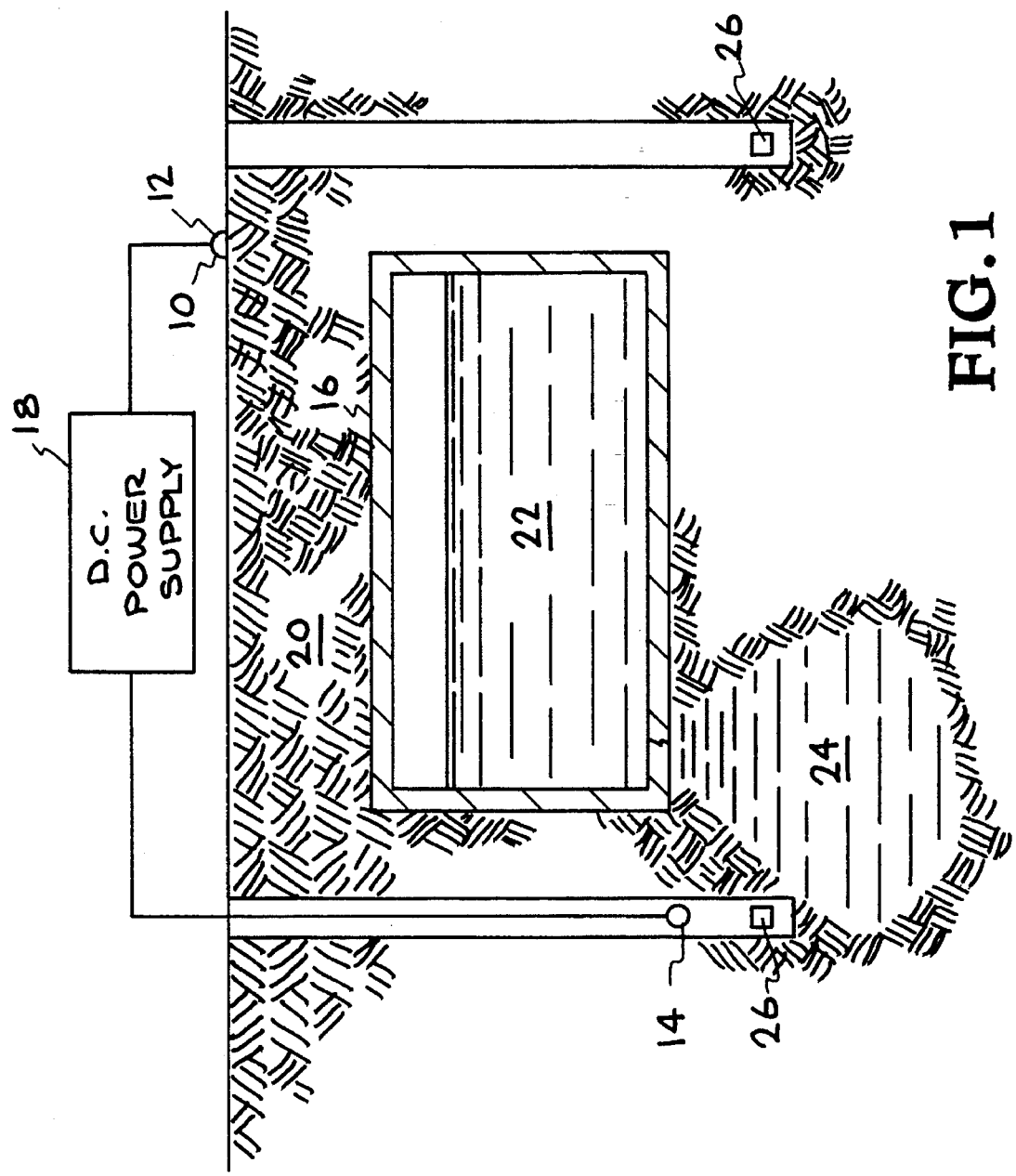

Many contaminants of interest have electrical properties similar to solid sand and are therefore difficult to detect because of low contrast. This method provides a way of increasing the detection capability for certain liquids present in subsurface contaminant plumes. Distances over which this method may be used to map soil resistivity range from tens to hundreds of meters from the electrode locations. Because the Electrokinetic System (EKS) causes changes analogous to those of a tracer, this method increases the detectability of subsurface contamination by searching for changes caused by the "tracer". Subsurface features unrelated to the subsurface liquid transport (such as changes in soil type) are eliminated. In this fashion small changes in resistivity caused by electrokinetic transport of low-contrast liquids such as hydrocarbons become detectable. Other uses for this invention include monitoring clean-up processes which rely on electrokinetic phenomena such as electroosmosis, electrophoresis, electromigration and dielectrophoresis for the transport of contaminants. The difference tomographs may be indicative of changes in the spatial distribution of contaminants caused by the EKS.

To image the resistivity distribution between two boreholes, a number of electrodes are placed in electrical contact with the soil in each borehole and/or along the ground surface. Using an automatic data collection and switching system, a known alternating current or direct current is then applied to two electrodes and the resulting voltage difference between other pairs of electrodes is measured. Each ratio of measured voltage and current is a transfer resistance. A current is applied between two other electrodes and the voltage differences is measured using electrode pairs not being used for the source current. This process is repeated until many combinations are measured.

The EKS system will consist of electrodes embedded in boreholes driven into soil, and/or at the ground surface or in leaking liquid storage tanks, and, a direct current (DC) or alternating current (AC) power supply. The EKS electrodes create a potential field in the region between the electrodes. Electrokinetic transport (electrophoresis or electroosmosis) or electromigration occurs in response to the field and moves some of the subsurface liquids or particles and ions within the liquids. For the purposes of this invention, the EKS role is to cause enough liquid or ion transport to make the liquid/ions detectable by using ERT. As the liquid moves, the real and imaginary parts of the electrical resistivity may change as the liquid/ion content of the solid changes.
}

Changes in electrical resistivity then become indicators to the presence of such liquids/ions and their location.

The resistivity of natural soils is generally very heterogeneous and may vary over a few orders of magnitude. Many of the liquid contaminants present in soils have electrical properties which are similar to those of soils; thus, the soil's heterogeneity tends to make the contaminates hard to detect. However, when ERT tomographs are collected before and after the EKS is used, the heterogeneity of the soil's electrical properties remain constant while changes in soil resistivity are caused by electrokinetic transport of liquids or electromigration of ions. By subtracting the "before EKS" tomograph from the "after EKS" tomograph, the soil resistivity changes that should be observed are those due to the electrokinetic transport or to electromigration. This method will increase the detectability of subsurface contamination and will increase the detectability of subsurface contamination because the EKS causes changes in fluid movement that are analogous to those of a tracer. By searching for changes caused by the "tracer", subsurface features unrelated to the subsurface liquid transport (such as changes in soil type) are eliminated. In this fashion small changes in resistivity caused by electrokinetic transport of low-contrast liquids such as hydrocarbons may be detectable.

A potential application of this concept is illustrated schematically by the drawing. EKS cathode 10 is emplaced at ground surface 12. EKS anode 14 is emplaced near the bottom of storage tank 16. A DC power supply 18 creates a potential difference between EKS anode 14, EKS cathode 10, and the soil 20 between them. If liquid 22 leaks from the tank 16 and said liquid or entrained particles can be transported by some electrokinetic phenomena (electroosmosis of electrophoresis), or by electromigration of charged ions and complexes, the liquid plume 24 (or entrained particles or ions within the liquid) will be displaced sideways. The displacement distance will be proportional to the electric potential differences created by the EKS, the electrokinetic mobility of the liquid and the hydraulic conductivity of the soil. The displacement direction can be reversed by reversing the polarity of the EKS DC power supply. ERT electrodes 26 are used to map changes in soil resistivity caused by displacement of the leaking liquid or of ions within the liquid.

The following is a method for subsurface imaging using electrokinetic phenomena and electrical resistance tomography:

1. Determine whether the liquid of interest and the geologic materials which contain the fluid allow electrokinetic transport over an acceptable period of time. The transport velocity will be a function of the properties of the soil, liquid and voltage gradients applied by the EKS system. Electrokinetic transport depends on the electroosmotic permeability of the soil and on the interfacial properties of particles and liquid, or the interfacial properties of the liquid and soil minerals. Electrokinetic permeability is nearly invariant with soil type and depends on the static electric field distribution in the soil, on the electrolyte concentration and ionic strength, and on the specific absorptivity of ions. Changes in bulk resistivity of the soil/liquid system can be related to changes in contaminant content when there is sufficient contrast between the electrical conductivity of the liquid and the soil, or when the presence of the liquid changes the interfacial properties described above.

2. Emplace ERT electrodes at the ground surface or in boreholes such that the electrodes are in good electrical contact with the formation. Electrodes placed at the ground surface can be used when the region of interest is less than 20 to 30 meters deep. Measurements can also be made between electrodes in two boreholes or between the surface and borehole electrodes. Similarly, electrodes for the EKS system are emplaced in boreholes, at the ground surface or both. Another embodiment of the concept is to use the same electrodes for EKS transport and for ERT. Electrodes in each borehole make electrical contact with the formation. Current is driven through the formation from two electrodes and the potential difference is measured between other electrode pairs. The procedure is repeated for many combinations of source and receiver electrode positions in the same hole or in different holes.

The drawing shows one possible application where an electrokinetic system (EKS) is used to displace a liquid plume. ERT measurements are used to make tomographs before, during and after the EKS system is used to transport the substance of interest. Difference ERT images show regions in the soil where resistivity changes caused by the electrokinetic transport of a contaminant have occurred. These changes in resistivity can then be used to determine the location of the contaminant plume.

3. Apply a known current to two ERT electrodes and measure the resulting voltage difference between other pairs of electrodes. Next, apply the current between two other electrodes and again measure the voltage differences using electrode pairs not being used for the source current. Each ratio of measured voltage and current is a transfer resistance. Repeat this process until all the linearly independent combinations of measurements are measured. These measurements for a cross-borehole survey are similar to those used in a conventional surface dipole-dipole resistivity survey.

4. Resistance measurements of the soil or rock system are made before the electrokinetic system causes movement of the substance of interest.

5. The electrokinetic system is energized for a period of time sufficiently long to cause detectable transport of the contaminate or other substance of interest.

6. The measurements are repeated as the electrokinetic process moves the location of the substance/ion/particle thereby changing the original resistivity (real and imaginary resistivity or real and imaginary impedance) distribution of the soil.

7. Tomographs of electrical resistivity (or electrical conductivity) are calculated using the resistance data collected. A tomography algorithm that solves Poisson's equation is used to invert the resistance data into a tomograph that shows the distribution of resistivities (both real and imaginary or the distribution of impedances both real and imaginary) within the region of interest. "Before EKS" and "during EKS" (or "after EKS") tomographs are calculated; pixel by pixel differences between the "before EKS" and "during EKS" tomographs are also calculated and difference tomographs generated. Alternatively, the percent difference of relative intensity between the "before EKS" and "during EKS" (or "after EKS") tomographs are calculated to generate difference tomographs.

8. The difference tomographs of step 7 show differences in resistivity which are then related to location changes.

Changes and modifications in the specifically described embodiments can be carried out without departing from the scope of the invention, which is intended to be limited by the scope of the appended claims.

We claim:

1. A method for subsurface imaging of soils/rocks using electrokinetic phenomena and electrical resistance tomography, comprising:

a. measuring ground resistance at least twice;

b. calculating an electrical resistance tomograph from the measured ground resistance;

c. moving a liquid of interest by activating an electrokinetic system for a period of time;

d. re-measuring ground resistance at least twice as said electrokinetic system changes spatial distribution of a fluid of interest;

e. calculating an electrical resistance tomograph from the re-measured ground resistance;

f. calculating a difference tomograph from the tomographs produced from said measuring and said re-measuring steps; and g. relating said difference tomograph to transport of said fluid of interest.

2. The method of claim 1, wherein step (a) is carried out with electrodes implanted in boreholes.

3. The method of claim 1, wherein step (a) is carried out with electrodes emplaced on the surface of the ground.

4. The method of claim 1, wherein step (a) is carried out with electrodes implanted in boreholes and emplaced on the surface of the ground.

5. The method of claim 1, wherein step (d) is carried out periodically.

6. The method of claim 1, wherein step (d) is carried out by injecting direct or alternating current into the subsurface.

7. The method of claim 1, wherein step (d) is carried out with the same set of electrodes used in step (a).

8. The method of claim 1, wherein step (d) is carried out with a different set of electrodes used in step (a).

9. The method of claim 1, wherein step (f) is carried out by calculating the pixel by pixel difference of the tomographs produced in steps (b) and (e), to show the resistivity difference.

10. The method of claim 1, wherein step (f) is carried out by calculating the percent difference of relative intensity between the tomographs produced in steps (b) and (e), to show the resistivity difference.

11. The method of claim 1, wherein step (f) is carried out by calculating a ratio of intensity between the tomographs produced in steps (b) and (e), to show the resistivity difference.

12. A method for subsurface imaging of soils/rocks using electrokinetic phenomena and electrical resistance tomography, comprising:

a. measuring ground resistance at least twice;

b. calculating an electrical resistance tomograph from the measured ground resistance;

c. moving a liquid of interest by activating an electrokinetic system for a period of time;

d. re-measuring ground resistance at least twice after said electrokinetic system changes spatial distribution of a fluid of interest;

e. calculating an electrical resistance tomograph from the re-measured ground resistance;

f. calculating a difference tomograph from the tomographs produced from said measuring and said re-measuring steps; and g. relating said difference tomograph to transport of said fluid of interest.

13. A method for subsurface imaging of soils/rocks using electrokinetic phenomena and electrical resistance tomography, comprising:

a. measuring ground resistance at least twice;

b. calculating an electrical resistance tomograph from the measured ground resistance;

c. moving a liquid of interest by activating an electrokinetic system for a period of time;

d. re-measuring ground resistance at least twice during and after said electrokinetic system changes spatial distribution of a fluid of interest;

e. calculating an electrical resistance tomograph from the re-measured ground resistance;

f. calculating a difference tomograph from the tomographs produced from said measuring and said re-measuring steps; and g. relating said difference tomograph to transport of said fluid of interest.

14. A method for subsurface imaging using electrokinetic phenomena and electrical resistance tomography (ERT) comprising:

a. determining whether a liquid of interest and the geologic materials which contain the fluid allow electrokinetic transport over an acceptable period of time;

b. emplacing ERT electrodes at ground surface or in boreholes;

c. emplacing electrodes for an electrokinetic system (EKS) in boreholes, at the ground surface or both;

d. applying a known first current to two ERT electrodes;

e. measuring resulting voltage difference between other pairs of electrodes;

f. applying a current between two other electrodes;

g. measuring voltage differences using electrode pairs not being used for said first current;

h. repeating (a) through (g) until many combinations of measurements are measured;

i. recording resistance measurements of soil or rock system before said electrokinetic system causes movement of substance of interest;

j. energizing said electrokinetic system for a period of time sufficiently long to cause detectable transport of a contaminate or other substance of interest;

k. repeating measurements as said energizing step causes movement of a substance/ion/particle thereby changing original resistivity (real and imaginary resistivity or real and imaginary impedance) distribution of said soil;

l. calculating "before EKS" tomographs using resistance data collected before said EKS system is energized in said energizing step;

m. calculating "during EKS", "during and after EKS" tomographs using resistance data collected during and after said EKS system is energized in said energizing step;

n. calculating pixel by pixel differences between the "before EKS" and "during EKS" (or "after" EKS) tomographs;

o. generating difference tomographs from said "before EKS" and "during EKS" (or "after" EKS) tomographs; and p. relating said difference tomographs to location changes of said liquid of interest.

15. The method of claim 14, wherein step m includes calculating "after EKS" tomographs.

\* \* \* \* \*